Feb. 3, 1925.

F. W. ERICKSON 1,525,233

PIPE COUPLING

Filed March 28, 1924

INVENTOR
FREDERIC W. ERICKSON
BY
*A. W. Harrison*
ATTORNEY

Patented Feb. 3, 1925.

1,525,233

UNITED STATES PATENT OFFICE.

FREDERIC W. ERICKSON, OF PELHAM MANOR, NEW YORK.

PIPE COUPLING.

Application filed March 28, 1924. Serial No. 702,525.

*To all whom it may concern:*

Be it known that I, FREDERIC W. ERICKSON, a citizen of the United States, and resident of Pelham Manor, in the county of Westchester and State of New York, have invented certain new and useful Improvements in Pipe Couplings, of which the following is a specification.

This invention relates to couplings for pipes, conduits and the like, the term pipe or pipes being hereinafter employed for the sake of brevity and not of limitation. The invention has particular reference to couplings for ordinary pipes the ends of which have no special formations such as lips or flanges, but are externally threaded at their ends.

One of the objects of the invention is to provide a coupling the members of which are so shaped as to permit the pipes to be firmly and tightly joined even when they are considerably out of direct alinement.

Another object is to provide a coupling two members of which are joined by a left-hand thread the advantages of which will be explained hereinafter.

Another object is to provide an improved coupling which is so compact in form that it can be used in locations where the space for manipulation is so limited that ordinary pipe union or bolted flange union could not be employed.

Another object is to provide a simple and easily operated coupling which will provide a tight joint for pipes carrying gas, liquids, or electric wires.

With said objects in view, the invention consists in the improved coupling substantially as hereinafter described and claimed.

Of the accompanying drawings:—

Similar reference characters indicate similar parts in all of the views.

Figure 1:
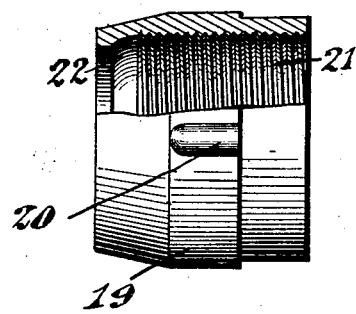
Figures 1, 2 and 3 are side elevations, partly broken out, or in section, of the three members of the coupling.
Figure 2:
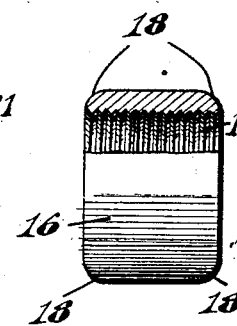
Figure 3:
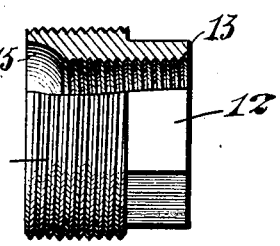

The bushing member 12, usually having a plurality of flat faces to be engaged by a wrench, is internally threaded at 13 to fit the threaded end 13′ of a pipe such as indicated at B. This threaded engagement is a right-hand one as usual. Externally the member 12 is provided with a left-hand thread 14 as best indicated by Figure 3. Said member has an internal annular concave seat 15 at one end.

The member 16, hereinafter referred to for convenience as the ring, has an internal right-hand thread 17 to fit the threaded end 17′ of a pipe such as indicated at A. Said member has rounded ends 18 forming convex annular surfaces the purpose of which will be presently explained.

The sleeve member 19, having means such as ribs 20 to be engaged by a suitable wrench to turn it when coupling the parts together, is internally left-hand threaded at 21 and at one end is formed with an internal annular concave seat 22.

Figure 4:
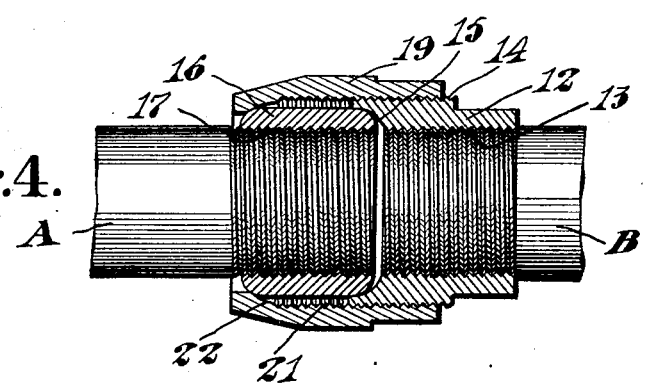
Figure 4 represents the coupling members in section and joining two pipe ends.
Figure 5:
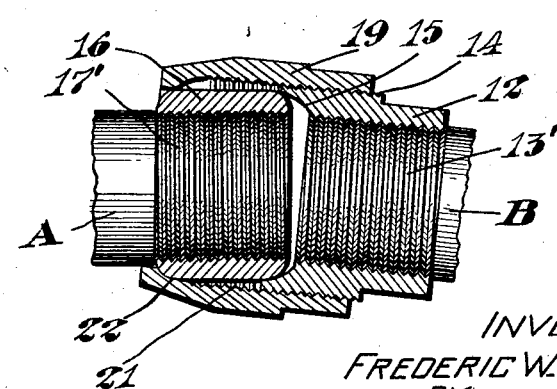
Figure 5 is a view similar to Figure 4 but illustrating the pipes as joined while out of alinement.

When coupling two pipes together, the ring 16 may be first screwed onto the end of a pipe such as indicated at A in Figures 4 or 5, and the bushing 12 then screwed onto the end of a pipe B. The sleeve 19, which may have been previously slipped onto the pipe A, is then slipped over the ring 16 and run onto the bushing 12. Owing to the left-hand threads of the sleeve and bushing (the threads 21 and 14) the relative rotation thereof can not result in backing the ring 16 off from the pipe A. The completion of the operation of coupling is effected, of course, by rotating the sleeve 19. If there should be any friction between the sleeve and the ring in the act of turning the sleeve, such friction necessarily has a tendency to screw the ring further onto the pipe A. But if the interengaging threads of the sleeve and bushing were right-hand, the action of turning the sleeve would have a tendency to back the ring off from the pipe.

A further advantage of the left-hand threaded structure referred to is that it tends to preserve the integrity of the coupling by reducing liability of any member of it being taken away from the others, prior to the coupling being applied to pipes. For instance, since the bushing is threaded both internally and externally, some plumber or steam fitter might remove it when he needs a reducing bushing, if the threads were right-hand. This would leave the electrical contractor with only the ring and sleeve, the coupling being incomplete.

By comparing Figures 4 and 5, it will be seen that the pipes need not be in alinement, and that no special care needs be taken as to which end of the ring 16 is screwed onto the pipe. The ring is reversible; that is, either end may take precedence when screwing it onto the pipe. Its rounded ends or annular convex portions 18 are adapted to closely fit the annular concave seats 15, 22, of the bushing and sleeve whether the pipes are in alinement as in Figure 4 or one tilted relatively to the other as in Figure 5, thereby permitting of great flexibility in installing conduit runs and enabling a higher speed of installation to be attained than is possible when pipe ends must meet in alinement.

When the coupling is employed for electrical installations all the members thereof are of metal suitable for the purpose, and the members are in such close contact at all times as to preserve continuity of ground.

Having now described my invention, I claim:—

1. A coupling including two abutting members internally threaded uniformly from end to end to engage threaded pipes and hold them closely end to end, said abutting members having their abutting ends relatively shaped to permit one to occupy a position either in or out of alinement with the other and still maintain a tight joint between them, and means for holding said abutting members closely together.

2. A coupling including two abutting members internally threaded uniformly from end to end to engage threaded pipes and hold them closely end to end, said abutting members having their abutting ends relatively shaped to permit one to occupy a position either in or out of alinement with the other, and a sleeve engaging the outer end of one of said members and having a threaded engagement with the other member.

3. A coupling comprising a bushing and a sleeve having cooperating threads for joining them and each having an annular concave seat, and an intermediate ring having annular convex ends, the said ring and bushing being internally threaded uniformly from end to end to engage threaded pipe ends and hold them closely end to end.

4. A coupling comprising an internally threaded bushing having an external left-hand thread and formed with an annular concave seat at one end, a sleeve having an internal left-hand threaded to engage the external thread of the bushing and formed with an internal concave seat, and an internally threaded ring having annular convex ends to engage the concave seats of the bushing and sleeve, the internal threads of said bushing and ring being uniform from end to end.

In testimony whereof I have affixed my signature.

FREDERIC W. ERICKSON.